United States Patent

Schütz et al.

Patent Number: 5,001,227
Date of Patent: Mar. 19, 1991

[54] FIBRE-REACTIVE: CHROMIUM COMPLEX AZO OR AZOMETHINE DYES HAVING A BIDENTATE CHELATING GROUP AND A MONOFUNCTIONAL NEUTRAL LIGAND

[75] Inventors: Hans U. Schütz, Basel, Switzerland; Ulrich Schlesinger, Binzen; Gerhard Back, Lörrach, both of Fed. Rep. of Germany

[73] Assignee: Ciba-Geigy Corporation, Ardsley, N.Y.

[21] Appl. No.: 669,942

[22] Filed: Nov. 9, 1984

[30] Foreign Application Priority Data

Nov. 10, 1983 [CH] Switzerland .................. 6068/83

[51] Int. Cl.$^5$ .................. C09B 62/255; C09B 62/477; D06P 1/382; D06P 1/384
[52] U.S. Cl. .................. 534/617; 534/622; 534/619; 534/627; 534/628; 534/629
[58] Field of Search .............. 534/619, 622, 627, 628, 534/, 629, 617

[56] References Cited

U.S. PATENT DOCUMENTS

| | | | |
|---|---|---|---|
| 2,824,094 | 2/1958 | Ackermann et al. | 534/693 |
| 3,168,512 | 2/1965 | Burhler et al. | 534/693 |
| 3,356,671 | 12/1967 | Johnson et al. | 534/712 |
| 3,538,073 | 11/1970 | Mack et al. | 534/619 X |
| 3,728,328 | 4/1973 | Lienhard et al. | 534/693 |
| 3,878,158 | 4/1975 | Brouard et al. | 260/37 |
| 4,008,211 | 2/1977 | Lienhard et al. | 534/710 X |
| 4,012,369 | 3/1977 | Brouard et al. | 260/146 |
| 4,019,857 | 4/1977 | Breda | 8/42 |
| 4,045,423 | 8/1977 | Brouard et al. | 260/147 |
| 4,123,429 | 10/1978 | Brouard et al. | 260/147 |
| 4,218,367 | 8/1980 | Brouard et al. | 260/146 |

FOREIGN PATENT DOCUMENTS

| | | | |
|---|---|---|---|
| 933622 | 9/1955 | Fed. Rep. of Germany | 534/619 |
| 2034315 | 8/1972 | France | 534/622 |
| 793903 | 4/1958 | United Kingdom | 534/619 |
| 949960 | 2/1964 | United Kingdom | 534/619 |
| 1271226 | 4/1972 | United Kingdom | 534/622 |
| 1427904 | 3/1976 | United Kingdom | 534/619 |
| 1511746 | 5/1978 | United Kingdom | 534/622 |

*Primary Examiner*—Floyd D. Higel
*Attorney, Agent, or Firm*—Wenderoth, Lind & Ponack

[57] ABSTRACT

The invention relates to chromium complexes of the formula

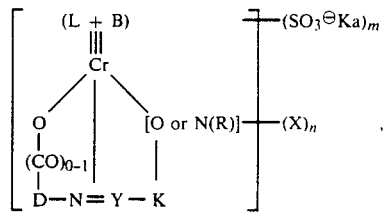

in which L is $H_2O$, $NH_3$, $R_2$—OH, $R_2$—$NH_2$, $(R_2)_2NH$, $(R_2)_3N$ or pyridine, wherein $R_2$ is $C_{1-6}$-alkyl unsubstituted or substituted by halogen, $C_{1-4}$-alkoxy or amino, B is 8-hydroxyquinoline, 5-chloro-8-hydroxyquinoline, 5-hydroxyacridine, 6-hydroxy-4,7-phenanthroline, pyridine-2-carboxylic acid, 8-carboxyquinoline, 5,7-dibromo-8-hydroxyquinoline, o-hydroxyaniline, o-hydroxynaphthylamine, proline, glycine, serine, aspartic acid or $R_1$—$CH(NH_2)$—COOH, wherein $R_1$ is $C_{1-6}$-alkyl unsubstituted or substituted by halogen, $C_{1-4}$-alkoxy or amino, D is benzene or naphthalene, Y is the nitrogen atom or the CH group, K, in the event that Y is the nitrogen atom, is naphthol, naphthylamine, 5-pyrazolone, 5-aminopyrazole, 1-phenyl- or 1-naphthyl-5-aminopyrazole, 1-phenyl- or 1-naphthyl-5-pyrazolone, 2,6-dihydroxy-3-cyano- or -3-carboxamido-4-alkylpyridine, 6-hydroxypyrid-2-one, acetoacetanilide, benzoylacetanilide or phenol, or, in the event that Y is the CH group K is o-hydroxybenzaldehyde or o-hydroxynaphthaldehyde, D and K independently of each other are unsubstituted or substituted by $C_{1-5}$-alkyl, $C_{1-4}$-alkoxy, acylamino having 1 to 6 carbon atoms, benzoylamino, amino, monoalkylamino or dialkylamino each having 1 to 4 carbon atoms, phenylamino, alkoxycarbonyl having 1 to 4 carbon atoms in the alkoxy, radical, nitro, cyano, trifluoromethyl, halogen, sulfamoyl, carbamoyl, ureido, hydroxyl, $C_{1-4}$-alkylsulfonyl, carboxyl, sulfomethyl, phenylazo or naphthylazo, and D and K contain the —$(CO)_{0-1}$—O— and —[O or N(R)]— adjacent to the —N=Y— and R is hydrogen, $C_{1-4}$-alkyl or phenyl, Ka is a cation, X is acryloyl, monohalogenoacryloyl, dihalogenoacryloyl, trihalogenoacryloyl, monohalogenomethacryloyl, dihalogenomethacryloyl, trihalogenomethacryloyl, monohalogenopropionyl, dihalogenopropionyl, phenylsulfonylpropionyl, methylsulfonylpropionyl, vinylsulfonyl, $\beta$-chloroethylsulfonyl, $\beta$-sulfatoethylsulfonyl, monohalogenopyrimidyl, dihalogenopyrimidyl, trihalogenopyrimidyl, monohalogenotriazinyl, dihalogenotriazinyl, X is bonded to D, K or B, D and K, D and B or K and B directly or via

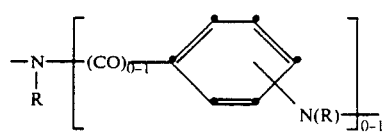

or —$CH_2$—$N(R)$—, m is 1, 2 or 3 and n is 1 or 2.

These chromium complexes are suitable for dyeing nitrogen-containing or hydroxy-containing materials and they produce level dyeings having good all-round fastness properties.

7 Claims, No Drawings

FIBER-REACTIVE 1:1 CHROMIUM COMPLEX-AZO OR AZOMETHINE DYES HAVING A BIDENTATE CHELATING GROUP AND A MONOFUNCTIONAL NEUTRAL LIGAND

Metal complex dyes have been known for a long time and are widely used for dyeing and printing fibrous textile materials in all manner of shades. In view of the increasingly high demands on these dyes, for example in relation to the levelness of the dyeings and the fastness level, the current state of the art is frequently not fully satisfactory For instance, many existing 1:2 metal complexazo or azomethine dyes do not meet presentday requirements on the levelness of the dyeings owing to lack of diffusion of the dyes in the fibre; most of the existing 1:1 metal complexazo or azomethine dyes have the disadvantage that they need to be dyed at a strongly acid pH at which some fibre materials can be damaged It is the object of the present invention to provide novel metal complexazo or azomethine dyes which are readily accessible and easily applied to produce dyeings which are level and also have good all-round fastness properties, in particular wet fastness properties, which meet presentday requirements It was found that this object is achieved with the novel chromium complex dyes defined hereinafter.

The present invention accordingly provides chromium complex dyes of the formula

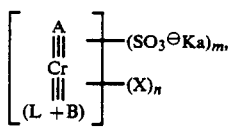 (1)

in which A is the radical of a dicyclically metallisable azo or azomethine dye, B is the radical of a monoanionic bidentate complexible organic compound which is bonded to the chromium atom via a nitrogen atom, L is a colourless monofunctional ligand, X is a fibre-reactive radical, Ka is a cation, m is 1, 2, or 3, n is 1 or 2, and the X radical and the $SO_3^-Ka$ group are each bonded to the radical A and/or B.

The novel chromium complexes of the formula (1) are neutral. A monoanionic bidentate complexible organic compound, the B radical participates in the chromium complex with one covalent bond and one coordinate bond. As the chromium complexes of the formula (1) activate their maximum coordination number of 6, the complexes also contain a monofunctional ligand L where free electron pairs of the donor atoms are involved in the bonding.

The azo or azomethine dye radical A in the formula (1), in addition to the complexing groups, can contain the customary substituents which occur in dyes, for example alkyl groups having 1 to 5 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, monoalkylamino or dialkylamino each having 1 to 4 carbon atoms in the alkyl radical, phenylamino, alkoxycarbonyl having 1 to 4 carbon atoms in the alkoxy radical, nitro, cyano, trifluoromethyl, halogen, such as fluorine, chlorine and bromine, sulfamoyl, carbamoyl, ureido, hydroxyl, $C_{1-4}$-alkylsulfonyl, for example methylsulfonyl, carboxyl, sulfomethyl and sulfo, plus one or two fibre-reactive radicals X and arylazo groups, for example a phenylazo or naphthylazo group.

An azo or azomethine dye radical A can be in particular a radical of the formula

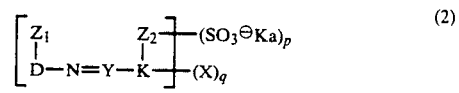 (2)

in which D is the radical of a diazo component of the benzene or naphthalene series, Y is a nitrogen atom or a CH group, K, in the event that Y is a nitrogen atom, is the radical of a coupling component, in particular of the benzene or naphthalene series or of the heterocyclic series, or in the event that Y is a CH group is the radical of an o-hydroxyaldehyde, $Z_1$, which is in the o-position to the —N=Y—radical, is a —O— or —COO—group, and $Z_2$ is a —O— or —N(R)—group where R is hydrogen, substituted or unsubstituted $C_{1-4}$-alkyl, for example, methyl, ethyl β-hydroxyethyl, isopropyl, n-propyl, sec.-butyl, isobutyl, tert.-butyl or n-butyl, or substituted or unsubstituted phenyl, and $Z_2$ is bonded to K in the adjacent position to the —N=Y—radical, Ka and X are as defined under the formula (1), p is 0, 1, 2 or 3 and q is 0, 1 or 2, and if p is 0 the B radical contains at least one $SO_3$–Ka group and if q is 0 at least one fiber-reactive radical X.

Of the large number of possible monoanionic bidentate complexible organic compounds which contain the B radical preference is given to the radicals which combine with the chromium to form a ring, in particular 5- or 6-membered rings.

In particular preferred compounds, B is a monoanionic bidentate complexible organic compound of the benzene, naphthalene or heterocyclic series or of the aliphatic series and can contain 1 or 2 sulfonic acid groups and a fibre-reactive radical X and is bonded to the chromium atom via a coordinately bonded nitrogen atom.

B is in particular a radical of the 8-hydroxyquinoline, 8-carboxyquinoline, pyridine-2-carboxylic acid, o-hydroxyaniline or o-hydroxynaphthylamine series, or a radical of the formula

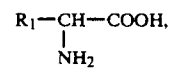

where $R_1$ is $C_{1-6}$-alkyl, such as methyl, ethyl, isopropyl, propyl, sec.-butyl, isobutyl, tert.-butyl, n-butyl, pentyl or hexyl, and can be further substituted, for example by halogen, such as fluorine, chlorine or bromine, $C_{1-4}$-alkoxy, such as methoxy or ethoxy, or amino groups, such as —$NH_2$.

In very particularly preferred compounds, B is the radical of 8-hydroxyquinoline or pyridine-2-carboxylic acid.

The monofunctional ligand L in the formula (1) predominantly is $H_2O$, $NH_3$, $R_2$—OH, $R_2$—$NH_2$, $(R_2)_2NH$, $(R_2)_3N$ or pyridine, where $R_2$ is as defined above under $R_1$.

The fibre-reactive radical X in the formula (1) is to be understood as meaning acyl radicals which have in the molecule one or more reactive groups or detachable substituents which are capable of reacting, for example, with cellulose materials, specifically with the hydroxyl groups of the cellulose, in the presence of acid-binding agents and with or without the action of heat or with synthetic or natural polyamide fibres, for example wool, specifically with the NH₂ groups of these fibres, to form covalent bonds. Innumerable such fibre-reactive groups are described in the literature.

X preferably is a fibre-reactive radical of the aliphatic or heterocyclic series which is bonded to the azo or azomethine dye radical A and/or to the radical B either directly or via a bridge member.

X is preferably bonded to the radical A and/or B via an amino group which can be monoalkylated, for example —NH—, —N(CH₃)—, —N(C₂H₅)— or —N(C₃H₇)—, or via a bridge member containing an amino group.

Specific examples of monohalogenated or dihalogenated symmetrical triazinyl radicals are 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino or 2-propylamino-4-chlorotriazin-6-yl, 2-β-oxethylamino-4-chlorotriazin-6-yl, 2-di-β-oxethylamino-4-chlorotriazin-6-yl and the corresponding sulfuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted 2-arylamino-4-chlorotriazin-6-yl, such as 2-phenylamino-4-chlorotriazin-6-yl, 2-(o-, m- or p-carboxy- or -sulfophenyl)-amino-4-chlorotriazin-6-yl, 2-alkoxy-4-chlorotriazin-6-yl, such as 2-methoxy or 2-ethoxy-4-chlorotriazin-6-yl, 2-cyclohexyloxy-4-chlorotriazin-6-yl, 2-(phenylsulfonyl)-methoxy-4-chlorotriazin-6-yl, 2-aryloxy- and substituted 2-aryloxy-4-chlorotriazin-6-yl, such as 2-phenoxy-4-chlorotriazin-6-yl, 2-(p-sulfophenyl)-oxy-4-chlorotriazin-6-yl, 2-(o-, m- or p-methyl- or -methoxyphenyl)-oxy-4-chlorotriazin-6-yl, 2-alkylmercapto- or 2-arylmercapto-4-chlorotriazin-6-yl, such as 2-β-hydroxyethylmercapto-4-chlorotriazin-6-yl, 2-phenylmercapto-4-chlorotriazin-6-yl, 2-(4'-methylphenyl)-mercapto-4-chlorotriazin-6-yl, 2-(2',4'-dinitro)-phenylmercapto-4-chlorotriazin-6-yl, 2-methyl-4-chlorotriazin-6-yl, 2-phenyl-4-chlorotriazin-6-yl and the 2-methoxy-4-fluorotriazin-6-yl radical.

Of particular interest as fibre-reactive radicals are fluoro-1,3,5-triazine radicals of the formula

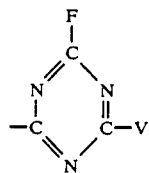

where particular examples of the substituent V on the triazine ring are: radicals of primary, secondary and tertiary amines, such as —NH₂, —NHC₂H₅, —N(C₂H₅)₂, —NH-CH(CH—(CH₃)₂, —NHC₂H₄OH, —N(C₂H₄OH)₂, morpholino, piperidino, N-phenylamino, N-(2-, 3- or 4-sulfophenyl)-amino, N-toluidino, N-(2,4- or 2,5-disulfophenyl)-amino and N-(γ-methoxypropyl)amino, and C₁₋₄-alkoxy radicals, such as methoxy, ethoxy, isopropoxy, propoxy or phenoxy.

Also of interest are reactive radicals which have the following formula

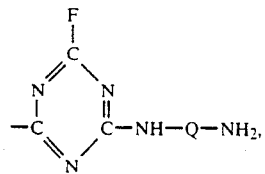

in which Q is an aliphatic or aromatic bridge member. Radicals of this type can be further substituted with 2,4,6-trifluoro-1,3,5-triazine to form a radical of the formula

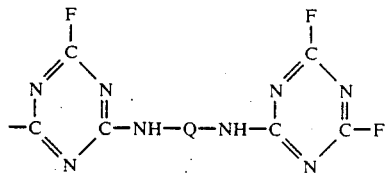

and this radical can finally be reacted with an amine. Examples of suitable amines of this type are ammonia, methylamine, ethylamine, dimethylamine, diethylamine, ethanolamine, diethanolamine, morpholine, piperidine, 2-, 3- or 4-aminotoluene, metanilic acid, sulfanilic acid, aniline, N-methylaniline, 4-aminobenzylsulfonic acid, 2-, 3- or 4-aminobenzoic acid, naphthylaminomonosulfonic, naphthylaminodisulfonic and naphthylaminotrisulfonic acids and also amino-containing dyes.

Examples of suitable diamines which introduce the radical of the formula —NH—Q—NH₂ are: ethylenediamine, 1,3-diaminopropane, 1,6-diaminohexane, 1,3- and 1,4-phenylenediamine, 1,3-phenylenediamine-4-sulfonic acid, 1,4-phenylenediamine-2-sulfonic acid, 2,4-diaminotoluene, 4,4'-diaminodiphenyl-22'-disulfonic acid, 4,4'-diaminodiphenylurea-2,2'disulfonic acid, 2,5-diaminonaphthalene-4,8-disulfonic acid, 4,4'-diaminodiphenyl ether and 2,5-diaminobenzoic acid.

Others of interest are monohalogenopyrimidinyl, dihalogenopyrimidinyl and trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl- or -5-dichloromethyl- or -5-trichloromethyl- or 5-carbalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-sulfonyl, 1,4-dichlorophthalazine-6-sulfonyl or -6-carbonyl, 2,4-dichloroquinazol-7-ine or -6-sulfonyl or -carbonyl, 2- or 3- or 4-(4',5'-dichloropyridaz-6'-on-1'-yl)-phenylsulfonyl or -carbonyl, β-(4',5'-dichloropyridaz-6'-on-1'-yl)-ethylcarbonyl, N-methyl-N'-(2,4-dichlorotriazin-6-yl)-carbamyl, N-methyl-N-(2-methylamino-4-chlorotriazin-6-yl)carbamyl, N-methyl-N-(2-dimethylamino-4-chlorotriazin-6-yl)carbamyl, N-methyl- or N-ethyl-N-(2,4-dichlorotriazin-6-yl)aminoacetyl, N-methyl-N-(2,3-dichloroquinoxaline-6-sulfonyl)aminoacetyl, N-methyl-N-(2,3-dichloroquinoxaline-6-carbonyl)- <>aminoacetyl, and the corresponding bromine or fluorine derivatives of the abovementioned chlorine-substituted heterocyclic radicals; among these for example 2-fluoro-4-pyrimidinyl, 2,6-difluoro-4-pyrimidinyl, 2,6-difluoro-5-chloro-4pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro--5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2-fluoro-2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-chloro-6-chloromethyl-4-pyrimidinyl, 2,6-difluoro-5-chloromethyl-b 4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; sulfonyl-containing triazine radicals, such as 2,4-bis-(phenylsulfonyl)-triazin-6-yl, 2(3'-carboxyphenyl)-sulfonyl-4-chlorotriazin-6-yl, 2-(3'-sulfophenyl)-sulfonyl-4-chlorotriazin-6-yl, 2,4-bis-(3'-carboxyphenylsulfonyl)-triazin-6-yl; sulfonyl-containing pyrimidine rings, such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis-methylsulfonyl-pyrimidin-4-yl, 2,6-bis-methylsulfonyl-5-chloro-pyrimidin-4-yl, 2,4-bis-methylsulfonyl-pyrimidin-5-yl-sulfonyl, 2-methylsulfonylpyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethyl-pyrimidin-4-yl, 2-methylsulfonyl-5-chloro-6-chloromethylpyrimidin-4-yl, 2-methylsulfonyl-4-chloro-6-methyl-pyrimidine-5-sulfonyl, 2-methylsulfonyl-5-nitro-6-methyl-pyrimidin-4-yl, 2,5,6-trismethylsulfonyl-pyrimidin-4-yl, 2-methylsulfonyl-5,6-dimethyl-pyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxypyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2-methylsulfonyl-6-chloropyrimidin-4-yl and -5-carbonyl, 2,6-bis(methylsulfonyl)-pyrimidine-4- or -5-carbonyl, 2-ethylsulfonyl6-chloropyrimidine-5-carbonyl, 2,4-bis-(methylsulfonyl)-pyrimidine-5-sulfonyl, 2-methylsulfonyl-4-chloro-6-methylpyrimidine-5-sulfonyl or -carbonyl; ammonium-containing triazine rings, such as 2-trimethylammonium-4-phenylamino- or -4-(o-, m- or p-sulfophenyl)-amino-triazin-6-yl, 2-(1,1-dimethylhydrazinium)-4-phenylamino- or -4-(o-, m- or p-sulfophenyl)-aminotriazin-6-yl, 2-(2-isopropylidene-1,1-dimethyl)-hydrazinium-4-phenylamino- or -4-(o-, m- or p-sulfophenyl)-aminotriazin-6-yl, 2-N-aminopyrolidinium- or 2-N-aminopiperidinium-4-phenylamino- or -4-(o-, m- or p-sulfophenyl)-aminotriazin-6-yl, and also 4-phenylamino- or 4-(sulfophenylamino)-triazin-6-yl radicals which, in the 2-position, contain 1,4-bis-azabicyclo[2.2.2]octane or 1,2-bis-azobicyclo[0.3.3-octane via quaternary nitrogen bonds, 2-pyridinium-4-phenylamino- or -4-(o-, m- or p-sulfophenyl)-aminotriazin-6-yl and corresponding 2-oniumtriazin-6-yl radicals which are substituted in the 4-position by alkylamino, such as methylamino, ethylamino or D-hydroxyethylamino, or alkoxy, such as methoxy or ethoxy, or aryloxy, such as phenoxy, or sulfophenoxy groups; 2-chlorobenzothiazole-5- or -6-carbonyl or -5- or -6-sulfonyl, 2-arylsulfonyl or -alkylsulfonylbenzotriazole-5- or -6-carbonyl or -5- or -6-sulfonyl, such as 2-methylsulfonyl- or 2-ethylsulfonyl-benzothiazole-5- or -6sulfonyl or -carbonyl, and the corresponding 2-sulfonylbenzothiazole-5- or -6-carbonyl or -6-sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl, and the N oxide of 4-chloroquinoline or 4-nitroquinoline-5-carbonyl.

Further examples are reactive groups of the aliphatic series such as monochloroacryloyl, dichloroacryloyl or trichloroacryloyl radicals or monobromoacryloyl or dibromoacryloyl radicals, such as $\alpha, \beta$-dibromopropionyl, —CO-CH=CH-Cl, —COCCl=CH$_2$, —CO-CCl=CH-CH$_3$, and also —CO-CCl=CH-COOH, —CO-CH=CCl-COOH, $\beta$-chloropropionyl, 3-phenylsulfonylpropionyl, 3-methylsulfonylpropionyl, $\beta$-sulfatoethylaminosulfonyl, vinylsulfonyl, $\beta$-chloroethylsulfonyl, $\beta$-sulfatoethylsulfonyl, $\beta$-methylsulfonylethylsulfonyl, $\beta$-phenylsulfonylethylsulfonyl, 2-fluoro-2-chloro-3,3-difluorocyclobutane-1-carbonyl, 2,2,3,3-tetrafluorocyclobutanecarbon-1-yl or -sulfon-1-yl, $\beta$-(2,2,3,3-tetrafluorocyclobut-1-yl)acryloyl, $\alpha$- or $\beta$-bromoacryloyl, the $\alpha$- or $\beta$-alkylsulfonyl or -arylsulfonyl-acryloyl group, such as $\alpha$- or $\beta$-methylsulfonylacryloyl.

The cation Ka in the formula (1) is a hydrogen, sodium, potassium, lithium or ammonium ion or the cation of an organic amine, for example of triethanolamine.

Particularly preferred chromium complexes have the formula

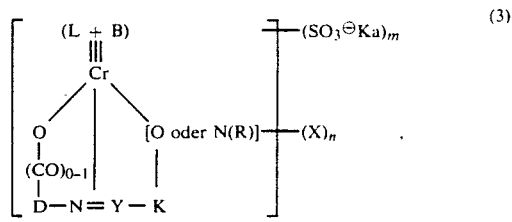

in which B is the radical of a monoanionic bidentate complexible organic compound of the benzene, naphthalene or heterocyclic series or the aliphatic series, L is a colourless monofunctional ligand, D is the radical of a diazo component of the benzene or naphthalene series which contains the —$(CO_{0-1}0$- group in the o-position relative to the —N=Y- group, Y is a nitrogen atom or a —CH group, K, in the event that Y is a nitrogen atom, is the radical of a coupling component of the benzene or naphthalene series or of the 5-pyrazolone, 5-aminopyrazole, acetoacetarylide or benzoylacetoarylide series which contains the —[0 or N(R)]—radical adjacent to the azo bridge and R is hydrogen, substituted or unsubstituted $C_{1-4}$-alkyl or substituted or unsubstituted phenyl, or in the event that Y is a CH group, K is the radical of an o-hydroxybenzaldehyde or o-hydroxynaphthaldehyde, and X is a fibre-reactive radical of the aliphatic or heterocyclic series which is bonded to D and/or K and/or B either directly or via a bridge member, Ka is a cation, m is 1, 2 or 3 and n is 1 or 2, and the $SO_3^{\ominus}Ka$ group is bonded to D and/or K.

Y is in particular a nitrogen atom.

X is in particular an acryloyl. monohalogenoacryloyl, dihalogenoacryloyl, trihalogenoacryloyl, monohalogenomethacryloyl, dihalogenomethacryloyl, trihalogenomethacryloyl, monohalogenopropionyl, dihalogenopropionyl, phenylsulfonylpropionyl, methylsulfonylpropionyl, vinylsulfonyl, β-chloroethylsulfonyl or β-sulfatoethylsulfonyl radical or a radical of the monohalogenopyrimidyl, dihalogenopyrimidyl or trihalogenopyrimidyl or monohalogenotriazinyl or dihalogenotriazinyl series, and can be bonded to D and/or K and/or B via a bridge member of the formula

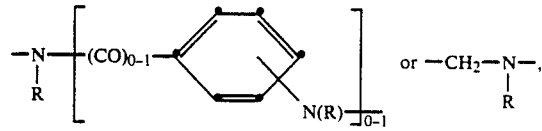

and R is as defined under the formula (3). X is especially an α, β-dibromopropionyl or α-bromoacryloyl radical.

Very particularly preferred chromium complexes have the formula

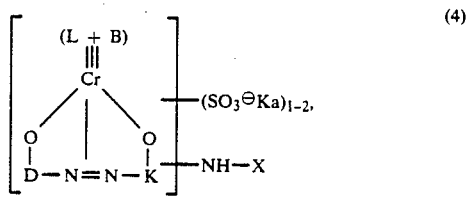

(4)

in which B %s the radical of 8-hydroxyquinoline, 5-chloro-8-hydroxyquinoline, 8-hydroxyquinoline-7-sulfonic acid, 5,7-dibromo-8-hydroxyquinoline, 8-hydroxyquinoline-5-sulfonic acid which can be substituted by the -NH-X radical, pyridine-2-carboxylic acid, alanine, serine, glycine, lysine, aspartic acid or proline, the colourless monofunctional ligand L is water, D is a benzene radical which contains the oxygen atom in the o-position relative to the azo bridge and can be substituted by sulfo, nitro, chlorine or the —NH—X radical or is a naphthalene radical which contains the oxygen atom in the o-position relative to the azo bridge and can be substituted by sulfo, nitro or the —NH—X radical, K is a naphthalene radical which can be substituted by the —NH—X radical and 1 or 2 sulfonic acid groups, said —NH—X radical being bonded to the naphthalene nucleus either directly or via the phenylamino radical, a 1-phenyl-3-methylpyrazol-5-one radical in which the —NH—X group can be bonded to the phenyl ring, or a 1(2',2''-disulfostilbene)-3-methylpyrazol-5-one radical in which which the —NH—X group is bonded in the 4''-position, or is a phenyl radical which can be substituted by $C_{1-4}$-alkyl, X is α, β-dibromopropionyl, α-bromoacryloyl, β-chloroacryloyl, 2,6-difluoro-5-chloropyrimidyl, 2,4-dichlorotriazinyl, 2-chloro-4-aminotriazinyl, 2-chloro-4-isopropoxytriazinyl, 2-chloro-4-(2'- or 3'-sulfophenylamino)-triazinyl, 2-chloro-4-ethoxytriazinyl, 2-chloro-4-cyclohexyloxytriazinyl, 2-chloro-4-phenylaminotriazinyl, 2-fluoro-4-(3'-sulfophenylamino)-triazinyl, 2-fluoro-4-(2'-methylphenylamino)-triazinyl, 2-fluoro4-isopropylaminotriazinyl, 2-fluoro-5-chloro-6-chloromethylpyrimidinyl or 2-fluoro-5-chloro-6-methylpyrimidinyl, and Ka is an alkali metal cation, in particular $Na^{\oplus}$.

Particular preference is also given to chromium complexes of the formula

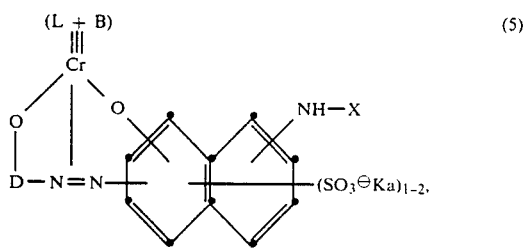

(5)

in which B, D, L and Ka are as defined under the formula (4), the azo group is bonded to the naphthalene nucleus in the o-position relative to the -O- radical, X is α, β-dibromopropionyl or α-bromoacryloyl, and the chromium complex contains no more than 1 or 2 sulfo groups.

The invention also provides a process for preparing the chromium complexes of the formula (1), which comprises reacting a bidentate complexible organic compound which contains the monoanionic radical B with a 1:1 chromium complex of the formula

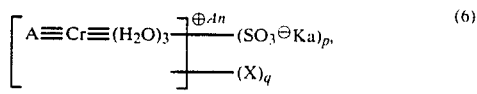

(6)

in which A, X and Ka are as defined under the formula (1), p is 0, 1, 2 or 3, q is 0, 1 or 2 and An is an anion, in an aqueous medium in the absence or presence of a colourless monofunctional ligand L other than water, and if desired subsequently reacting the resulting chromium complex with a compound, or compounds, which introduces the fibre-reactive radical(s) X, the radical B containing at least one sulfo group if p is 0.

The bidentate complexible organic compound is preferably reacted with the 1:1 chromium complex of the formula (6) at a temperature of 60 to 100° C. and at pH 5-11.

The reaction with a compound which introduces the reactive group(s) takes place in particular at a temperature of 15 to 30° C. and at pH 5-8.

The literature contains descriptions of many metallisable azo and azomethine dyes which can supply the radical A, for example of o,o'-dihydroxy-, o-carboxy-o'-hydroxy-, o-hydroxy-o'-aminoazo or azomethine compounds which are in particular of the formula

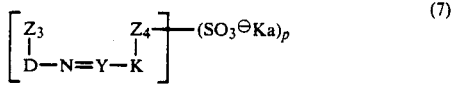

in which $Z_3$ is a hydroxyl, carboxyl or methoxy group, $Z_4$ is a hydroxyl or HN(R) group, D, K, Y, Ka, R and p are as defined under the formula (2), and D and/or K can contain the functional groups which are suitable for bonding the fibrereactive group(s) X, for example amino groups or groups which can be converted into amino groups, such as acetylamino and nitro groups. The compounds of the formula (7) in which Y is a nitrogen atom are prepared in a manner known per se, namely by diazotising an amine of the formula

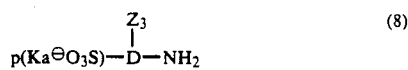

and coupling the diazo compound onto a coupling component of the formula

the D, K, $Z_3$, $Z_4$, Ka and p in the formulae (8) and (9) being as defined under the formula (7).

The diazotisation of the diazo component of the formula (8) is generally effected at low temperatures through the action of nitrous acid in an aqueous solution of a mineral acid, and the coupling onto the coupling component of the formula (9) is effected at acid, neutral or alkaline pH.

Examples of suitable amines of the formula (8) are: 2-amino-1-hydroxybenzene, 2-amino-1-methoxybenzene, anthranilic acid, 4- or 5-sulfonamidoanthranilic acid, 3- or 5chloroanthranilic acid, 4-chloro- or 4,6-dichloro-2-amino1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxyphen-5-yl methyl or benzyl sulfone, 2-amino-1-hdyroxyphen-4-yl methyl, ethyl, chloromethyl or butyl sulfone, 6-chloro-, 5-nitro- or 6-nitro-2-amino-1-hydroxyphen-4-yl methyl sulfone, 2-amino-1-hydroxybenzene-4- or -5-sulfamide, -sulf-N-methylamide or -sulf-N- D-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamine-4-chloro-2-amino-1-hydroxybenzene, 4,6-dinitro-2-amino-1-hydroxybenzene, 4-nitro-2-amino-1-hydroxybenzene-5- or -6-sulfonamide, 4- or 5-chloroanisidine, 4- or 5-nitroanisidine, 2-methoxy-5-methylaniline, 2,5-dimethoxyaniline, 2-anisidine-4- or -5- β-hydroxyethylsulfonyl-2-methoxyaniline, 4-methyl6-sulfo-2-amino-1-hydroxybenzene, 2-amino-4-sulfo-1-hydroxybenzene 4-chloro-6-sulfo-2-amino-1-hydroxybenzene, 6-chloro4-sulfo-2-amino-1-hydroxybenzene, 4-chloro-5-nitro-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-acetylamino-2-amino-1-hydroxybenzene 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4-chloro-2-amino-1-hydroxybenzene-5-sulfamide, 2-amino-1-hydroxybenzene-4-(N-2'-carboxypheny 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino2-hydroxy-7-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino1-hydroxy-6-sulfonaphthalene and 2-amino-1-hydroxy-4,8-disulfonaphthalene.

The coupling components of the formula (9) can be derived, for example, from the following groups of coupling components:

naphthols which couple in the o-position relative to the OH group and can be substituted by halogen, in particular chlorine, amino, acylamino, acyl, $C_{1-4}$-alkyl, $C_{1-4}$-alkoxy, sulfonamido, N-monosubstituted or N,N-disubstituted sulfonamido groups, sulfo and sulfonyl groups.

naphthylamines which couple in the o-position relative to the amino group and which can be substituted by halogen, in particular bromine, $C_{1-4}$-alkyl, $C_{1-4}$-alkoxy, sulfonamido, monosubstituted or disubstituted sulfonamido, sulfo or sulfonyl groups.

such 5-pyrazolones and 5-aminopyrazoles as have in the 1-position a phenyl or naphthyl radical which can be substituted by halogen, in particular chlorine, nitro, $C_{1-4}$-alkyl and alkoxy groups, sulfonamido, N-alkylated sulfonamido groups, sulfo or sulfonyl groups and in particular amino groups or acetylamino groups.

such 2,6-dihydroxy-3-cyano- or -3-carboxamido-4-alkylpyridines and 6-hydroxy-2-pyridones as are substituted in the 1-position by substituted or unsubstituted $C_{1-4}$-alkyl for example, methyl, isopropyl, β-hydroxyethyl, aminoethyl or γ-isopropoxypropyl, or by —NH₂ or a substituted amino group, for example dimethylamino or diethylamino, and carry a cyano or carboxamido group in the 3-position and a $C_{1-4}$-alkyl group, in particular methyl, in the 4-position.

such acetoacetanilides and benzoylacetanilides as can be substituted in the anilide nucleus by $C_{1-4}$-alkyl, alkoxy or alkylsulfonyl groups, $C_{1-4}$-hydroxyalkyl, alkoxyalkyl or cyanoalkylsulfonyl groups, sulfonamido or N-alkylated sulfonamido groups, sulfo, halogen and nitro, amino or acetylamino groups.

phenols which are substituted by low molecular weight acylamino groups and/or alkyl groups containing 1 to 5 carbon atoms and couple in the o-position.

Examples of such coupling components are: 2-naphthol, 1-naphthol, 1-hydroxynaphthalene-4-, -5- or -8-sulfonic acid or -3,6- or -4,8-disulfonic acid, 1,3- or 1,5-dihydroxynaphthalene, 1-hydroxy-7-aminonaphthalene-3-sulfonic acid, 2-naphthol-6-sulfonamide, 1-hydroxy-7-aminonaphthalene- or -7-N-methylaminonaphthalene- or -7-N-acetylaminonaphthalene-3-sulfonic acid, 2-hydroxynaphth-6-yl β-hydroxyethyl sulfone, 1-hydroxy-6-aminonaphthalene- or -6-N-methylaminonaphthalene- or -6-N-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)-aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxyamino-7-naphthol, 1-hydroxy-8-aminonaphthalene-5,7-disulfonic acid, 1-dimethylaminosulfonyl-amino-7-naphthol, 6- or 8-acetylamino-2-naphthol, 1-hydroxy-8-aminonaphthalene- or -8-acetylaminonaphthalene-3,5- or -3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3-4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1- or -6-sulfonic acid, 2-aminonaphthalene-5-, -6- or -7-sulfonamide, 2-amino-6-N(methyl, ethyl, isopropyl, β-oxyethyl or methoxypropyl)naphthalenesulfonamide, 2-aminonaphthalene-6-sulfanilide, 2-amino6-N-methylnaphthalenesulfanilide, 1-aminonaphthalene-3-, -4- or -5-sulfonamide, 1-aminonaphth-5-yl methyl or ethyl sulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6- or -7-sulfonamide, 2-(3'-chlorophenylamino)-naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carboxamido-5-pyrazolone, 1-(2'-, 3'- or 4'-methylphenyl)-3-methyl-5-pyrazolone, 1-[3'- or 4'-(β-hydroxyethylsulfonyl)-phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carboxamido-4-methyl-6-hydroxypyrid-2-one, acetoacetanilide, acetoacet-o-, -m- or -p-sulfoanilide, acetoacet-4-(β-hydroxyethylsulfonyl)anilide, acetoacet-o-anisidide, acetoacetnaphthylamide, acetoacet-o-toluidide, acetoacet-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol or, in particular 3-dimethylaminophenol or 3-diethylaminophenol, 4-t-butylphenol, 4-t-amylphenol, 2- or 3-acetylamino-b 4-methylphenol, 2-methoxycarbonylamino-4-methylphenol, 2-ethoxycarbonylamino-4-methylphenol, 3,4-dimethylphenol and 2,4dimethylphenol, 3-amino-4-sulfophenol, 1-(4'-aminophenyl)3-methyl-5-pyrazolone, 1-(2'-, 3'- or 4'-sulfophenyl)3-methyl-5-pyrazolone, 1-(2'-chloro-4'- or -5sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'-, 3'- or 4'0 -chloro- or -methyl- or -sulfophenyl)3-carboxy-5-pyrazolone, 1-[5"-sulfonaphth-2'-yl]-3-methyl-5-pyrazolone, 1-[4"-amino-2',2"-disulfostilb-4'-ene]-3-methyl-5-pyrazolone, 1-ethyl-3-cyano-4-methyl-6-hydroxypyrid-2-one, 1-ethyl-3-sulfomethyl-4-methyl-6-hydroxypyrid-2-one, 2,6-dihydroxy-4-methyl-3-sulfomethylpyridine, 2,4,6-trihydroxypyrimidine, 1-carbopropoxy-amino-7-naphthol and 1-hydroxy-8-aminonaphthalene-3-sulfonic acid.

To prepare the azomethine dyes of the formula (7), the abovementioned aromatic amines of the formula (8) are condensed in conventional manner with o-hydroxybenzaldehydes or o-hydroxynaphthaldehydes.

Examples of suitable aldehydes are: 2-hydroxybenzaldehyde, 3- or 5-methyl-2-hydroxybenzaldehyde, 3,5- or 3,6-dimethyl-2-hydroxybenzaldehyde, 5-butyl-2-hydroxybenzaldehyde, 5-chloro- or -bromo-2-hydroxybenzaldehyde, 3- or 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- or 4- or 5-nitro-2-hydroxybenzaldehyde, 3,5-dinitro- or 4-chloro-5-nitro-2-hydroxybenzaldehyde, 4-methoxy-2-hydroxybenzaldehyde, 1-hydroxy-2-naphthaldehyde and its derivative chlorinated in the 4-position, and 2-hydroxy-1-naphthaldehyde.

In preferred chromium complexes according to the invention, Y is a nitrogen atom and K is the radical of a coupling component of the naphthalene series, in particular the radical of an aminonaphtholmonosulfonic or aminonaphtholdisulfonic acid.

If desired, a free amino group in the radical D and/or K can be converted into an acylamino or alkylamino group after the coupling with an acylating or alkylating agent, and similarly a hydroxyl group in the radical D and/or K can be converted by alkylation into an alkoxy group.

In a version of the process for preparing the 1:1 chromium complex azomethine dye of the formula (6), the 1:1 chromium complex of the formula (6) is prepared not with the azomethine of the formula (7) but with a mixture of the amine of the formula (8) and an o-hydroxyaldehyde.

The amines of the formula (8), the coupling components of the formula (9) and the o-hydroxyaldehydes can contain radicals which can be converted into the amino groups, for example acetylamino or nitro groups. For example acetylamino groups and nitro groups can be converted into amino groups by hydrolysis and reduction respectively, advantageously after the preparation of the dyes of the formula (7) or the preparation of the 1:1 chromium complex of the formula (6).

The 1:1 chromium complexes are prepared by methods known per se. For example, the 1:1 chromium complex of the compound of the formula (6) is prepared by reacting the metal-free compound in an acid medium with a salt of trivalent chromium, such as chromium chloride, chromium fluoride or chromium sulfate, in the absence or presence of solubility promoters or chromination accelerants, for example alcohols or hydroxycarboxylic acids. Afterwards, the 1:1 complex is reacted at pH 5–11 with a compound which introduces the radical B.

Examples of compounds which are particularly suitable for introducing the radical B are: 8-hydroxyquinoline, 5-chloro-8-hydroxyquinoline, 8-hydroxy-5-, -6- or -7-sulfoquinoline, 5-hydroxyacridine, 6-hydroxy-4,7-phenanthroline, pyridine-2-carboxylic acid, 8-carboxyquinoline, 5,7-dibromo8-hydroxyquinoline, 2-hydroxyaniline, 2-hydroxy-1-aminonaphthalene, alanine, proline, glycine, lysine and aspartic acid.

If the reaction of the 1:1 chromium complex of the formula (6) with the organic compound introducing the radical B takes place in the presence of one of the abovementioned colourless monofunctional ligands L other than water, this produces a chromium complex of the formula

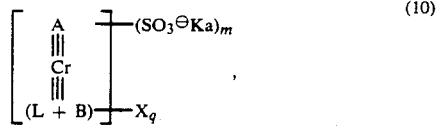

in which A, B, L, Ka, X and m are as defined under the formula (1) and q is 0, 1 or 2.

If the reactive group(s) X in the chromium complex of the formula (1) is bonded to the radical A, the reactive group(s) is advantageously introduced after the preparation of the 1:1 chromium complex of the formula (6) or preferably after the reaction of the 1:1 chromium complex of the formula (6) with the organic compound introducing the radical B. If the reactive group(s) X in the chromium complex of the formula (1) is bonded to the radical B, it is preferably introduced after the reaction with the 1:1 chromium complex of the formula (6).

The fibre-reactive group(s) X is or are introduced into the 1:1 chromium complex of the formula (6) or into the chromium complex of the formula (10) in a manner known per se by reacting these chromium complexes with one or two agents introducing or forming the radical(s) X; the radicals A and/or B in the formulae (6) and (10) have to contain functional groups which are suitable for bonding the fibre-reactive group(s) X. Examples of groups suitable for bonding the radicals X are unsubstituted or monoalkylated amino groups, such as —NH$_2$, —N(CH$_3$)H or —N(C$_2$H$_5$)H, and the β-oxyethylsulfonyl group.

The reactive group(s) which is or are bonded via an oxy, thio or preferably amino group is or are introduced by reacting the chromium complexes of the formulae (6) and (10) with one or two acylating agents which introduce one or two identical or different radicals X.

The fibre-reactive group(s) which is or are directly bonded to the radicals A and/or B, for example the β-sulfatoethylsulfonyl group, is or are formed in a manner known per se, for example by sulfating the abovementioned β-oxyethylsulfonyl group.

The invention also provides a process for dyeing textile materials with chromium complexes, which comprises using an aqueous liquor which contains a compound introducing the radical B, the 1:1 chromium complex of the formula

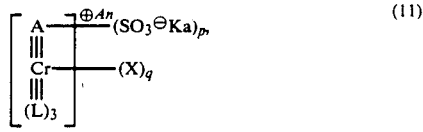

in which A, L, Ka and X are as defined under the formula (1), p is 0 to 3, q is 0 to 2 and An is an anion, and the textile material and can, if desired, also contain further additives, heating the liquor to 100° C. in continuous or stepwise fashion and then bringing it to an alkaline pH, and completing the dyeing, and wherein if p is 0 the radical B contains at least one SO$_3^\ominus$Ka group and if q is 0 at least one fibre-reactive radical X.

In particular, the compound introducing the radical B and the 1:1 chromium complex of the formula (11) are deployed in a molar ratio of 2:1 to preferably 1:1.

In a preferred version of the process, the dyeing liquor, which contains the abovementioned components, is raised to 60 to 80° C. in the course of 10 to 45 minutes, is held at said temperature for 10 to 45 minutes, is then raised to 100° C. in the course of 10 to 30 minutes, is maintained at said temperature for 30 to 90 minutes, is cooled down to 85° C., and is brought to pH 8-9 and is used to after-treat the dyeing at 85° C. for a further 10 to 30 minutes.

Examples of the further additives which the liquor may contain are inorganic or organic acids, in particular, acetic acid, alkali metal or ammonium salts, in particular ammonium sulfate, and, if desired, levelling agents.

As described above, the chromium complex of the formula (11) is obtained by reacting an azo or azomethine dye, in particular such a dye of the formula (2), in the presence or absence of a ligand L other than water, with one of the chroming agents mentioned and the fibre-reactive radicals can be introduced at any point of the process, but preferably after the preparation of the 1:1 chromium complex.

In the process according to the invention use is made in particular of 1:1 chromium complexes of the formula

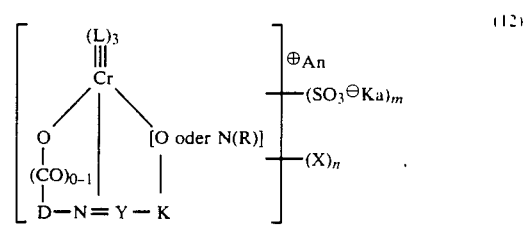

in which D, K, L, R, Ka, X, Y, m and n are as defined under the formula (3) and An is an anion, preferably of chromium complexes of the formula

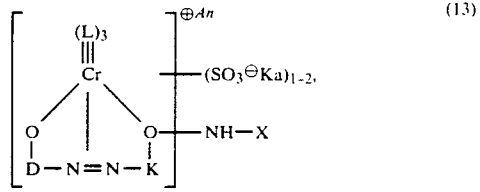

in which D, K, L, Ka and X are as defined under the formula (4) and An is an anion, and likewise preferably of chromium complexes of the formula

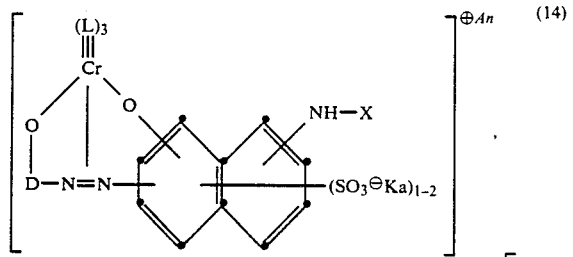

in which D, L, Ka and X are as defined under the formula (5) and An is an anion.

In the process according to the invention, the compound introducing the radical B can be any of the abovementioned compounds, and acylatable amino groups which are present in the radical B and which are not involved in the formation of the complex can have been previously reacted with an acylating agent introducing the fibre-reactive radical X. The compound introducing the radical B can be in particular 8-hydroxyquinoline or pyridine-2-carboxylic acid.

The process according to the invention can be carried out in the absence or presence of a colourless monofunctional compound L other than water, such as one of the abovementioned compounds.

In the process according to the invention, the chromium complex of the formula (1) is thus formed during the dyeing and produces the same colouristic advantages as are obtained with the dyes of the formula (1) which are prepared in substance and isolated.

The novel chromium complexes of the formula (1) and the chromium complexes prepared in the novel dyeing method are suitable for dyeing nitrogen-containing or hydroxyl-containing materials, such as wool, silk, leather, nylons and cotton. They produce level dyeings in yellow, brown, orange, red, blue, grey, green and black shades having good all-round fastness properties, in particular very good rub, wet, wet rub and light fastness. Furthermore, the dyes according to the invention are very compatible with fibre-reactive acid dyes. The abovementioned textile material can have been processed into many different forms, for example fibre form, yarn form or woven or knitted fabric form.

In the following examples the parts are by weight. The temperatures are given in degrees centigrade. Parts by weight relate to parts by volume as the gram relates to the 15 cubic centimeter.

EXAMPLE 1

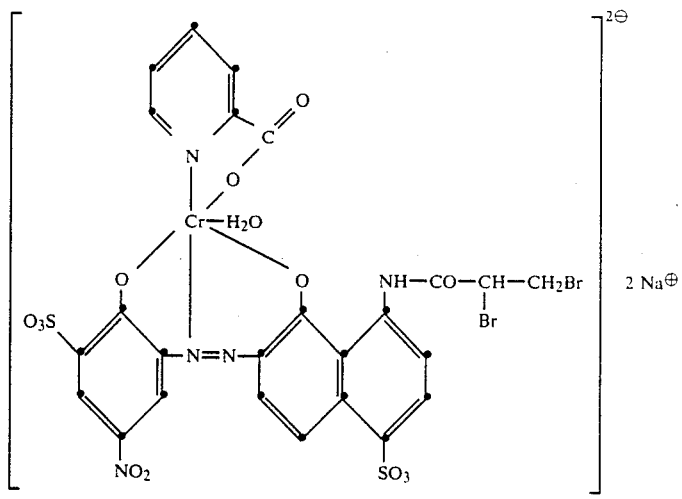

48.44 parts of a monoazo dye which is obtained by diazotising 4-nitro-6-sulfo-2-aminophenol and coupling the diazo compound onto 1-naphthol-8-amino-5-sulfonic acid are converted in conventional manner into the 1:1 chromium complex. The product is suspended in 400 parts of water, and 12.3 parts of pyridine-2-carboxylic acid are added. The suspension is heated to 75-80° while a pH of 7-7.3 is maintained with 2N NaOH, and turns into a solution. Said solution is stirred at 75-80° for 1 hour under constant pH control.

After the adduct formation has ended, the reaction solution is cooled down to 20-25°. 34 parts of 1,2-dibromopropionyl chloride, diluted with 5 ml of acetone, are added dropwise at 20-25° in the course of 20-30 minutes, and the pH is maintained at 6.5-7 with 2N NaOH. After 2 hours of stirring under pH control the reactive chromium complex obtained is clarified, and the solution is evaporated to dryness. The dye obtained dyes wool by the method of Dyeing Example 2 in navy shades having excellent fastness properties.

EXAMPLE 2

53.9 parts of the 1:1 chromium complex of a monoazo dye obtained by alkaline coupling of 1-diazo-2-naphthol-4-sulfonic acid onto 2-amino-5-naphthol-7-sulfonic acid are dissolved at pH, 7 in 500 parts of water using dilute sodium hydroxide solution. After addition of 14.5 parts of 8-oxyquinoline the pH is adjusted to 6.5 with dilute sodium hydroxide solution and the reaction mixture is stirred at 90-95° C. for 30 minutes. The dye solution is cooled down to 50° C., and 15 parts of sodium bicarbonate are added. After stirring for 10 minutes it is cooled down to 10-15° C. with 200 parts of ice, 30 parts of 1,2-dibromopropionyl chloride are added dropwise in the course of about 1 hour, and the mixture is stirred at room temperature for a further 2-3 hours. The resulting, dissolved dye of the formula

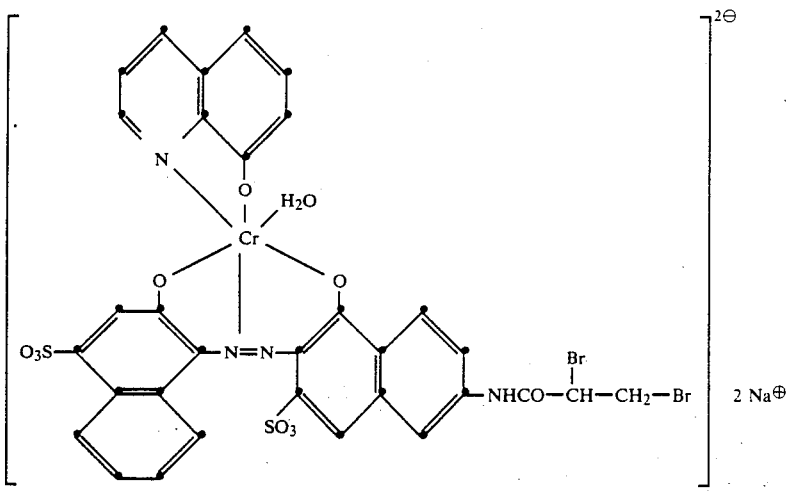

evaporated to dryness The dye, obtained in the form of a very readily water-soluble dark powder, dyes wool by the method of Dyeing Example 2 in dark blue shades having excellent fastness properties.

Further dyes with similar properties are obtained analogously by reacting the 1:1 chromium complexes of the monoazo compounds given in column I of Table 1 below with the colourless compounds listed in column II and subsequently acylating the resulting 1:2 chromium complex with 1,2-dibromopropionyl chloride. These dyes dye wool by the method of Dyeing Examples 1 and 2 in the shades given in column III.

TABLE 1

| Example | I | II | III |
|---|---|---|---|
| 3 | ![structure: HO3S-, OH, N=N, OH, NH2, SO3H, NO2] | pyridine-2-carboxylic acid | grey |
| 4 | " | ![structure: 8-hydroxyquinoline] | grey |
| 5 | ![structure: HO3S-, OH, N=N, OH, NH2, SO3H, NO2] | ![structure: 8-hydroxyquinoline with Cl] | greenish grey |
| 6 | " | ![structure: 8-hydroxyquinoline benzofused] | grey |

TABLE 1-continued

| Example | I | II | III |
|---|---|---|---|
| 7 | [structure: naphthalene with HO₃S, OH, N=N linkage to naphthalene with OH, SO₃H, NH₂] | [structure: phenol with OH, Br, Br, N-pyridine] | greyish blue |
| 8 | " | [structure: phenol with OH, HO₃S, N-pyridine] | greyish blue |
| 9 | [structure: naphthalene with HO₃S, OH, N=N linkage to naphthalene with OH, SO₃H, NH₂] | pyridine-2-carboxylic acid | greyish blue |
| 10 | " | [structure: phenol with OH, Cl, N-pyridine] | greyish blue |
| 11 | " | glycine | blue |
| 12 | " | aspartic acid | blue |
| 13 | [structure: naphthalene with HO₃S, OH, NO₂, N=N linkage to naphthalene with OH, SO₃H, NH₂] | pyridine-2-carboxylic acid | greenish grey |
| 14 | " | [structure: phenol with OH, HO₃S, N-pyridine] | greenish grey |
| 15 | " | [structure: phenol with OH, HO₃S, Cl, N-pyridine] | greenish grey |

TABLE 1-continued

| Example | I | II | III |
|---|---|---|---|
| 16 | [structure: naphthalene with OH, HO₃S, NO₂, linked via N=N to naphthalene with OH, SO₃H, NH₂] | lysine | greenish grey |
| 17 | " | glycine | greenish grey |
| 18 | " | aspartic acid | greenish grey |
| 19 | [structure: benzene with OH, HO₃S, NO₂, linked via N=N to naphthalene with OH, SO₃H, NH₂] | [structure: 8-hydroxyquinoline-sulfonic acid with OH, N, SO₃H] | reddish grey |
| 20 | " | [structure: 8-hydroxyquinoline with OH, N, Cl] | reddish grey |
| 21 | " | glycine | reddish grey |
| 22 | " | aspartic acid | reddish grey |
| 23 | [structure: benzene with OH, SO₃H, linked via N=N to naphthalene with OH, SO₃H, NH₂] | [structure: 8-hydroxyquinoline with OH, N] | violet-tinged grey |
| 24 | " | pyridine-2-carboxylic acid | violet |
| 25 | [structure: benzene with OH, NO₂, SO₃H, linked via N=N to naphthalene with OH, SO₃H, NH₂] | [structure: 8-hydroxyquinoline with OH, N] | blue |
| 26 | [structure: benzene with OH, NO₂, linked via N=N to naphthalene with OH, SO₃H, NH₂] | pyridine-2-carboxylic acid | bluish grey |

TABLE 1-continued

| Example | I | II | III |
|---|---|---|---|
| 27 | [structure: 2-hydroxy-4-nitrophenyl-azo coupled to pyrazolone with NH-N linkage to stilbene-2,2'-disulfonic acid-4-amino] | pyridine-2-carboxylic acid | orange |
| 28 | " | [structure: 8-hydroxyquinoline] | brownish orange |
| 29 | [structure: naphthalene with OH, SO₃H, NO₂ substituents, azo-linked to pyrazolone with NH-N to 4-aminophenyl] | pyridine-2-carboxylic acid | red |
| 30 | [structure: 2-hydroxy-4-chlorophenyl-azo-(1-hydroxy-8-amino-3,6-disulfo)naphthalene] | [structure: 8-hydroxyquinoline-5-sulfonic acid] | blue |
| 31 | " | pyridine-2-carboxylic acid | navy |
| 32 | " | [structure: 8-hydroxyquinoline] | navy |
| 33 | " | glycine | grey |
| 34 | " | alanine | grey |
| 35 | " | lysine | grey |
| 36 | " | aspartic acid | greenish grey |
| 37 | " | proline | grey |
| 38 | [structure: 5-sulfo-2-hydroxyphenyl-azo-(1-hydroxy-8-amino-naphthalene-sulfonic acid) with Cl] | pyridine-2-carboxylic acid | bluish grey |

TABLE 1-continued

| Example | I | II | III |
|---|---|---|---|
| 39 | " | 8-hydroxyquinoline structure | greenish grey |
| 40 | " | glycine | violet-tinged blue |
| 41 | " | alanine | grey |
| 42 | " | lysine | violet |
| 43 | " | aspartic acid | grey |
| 44 | " | proline | violet |
| 45 | Cl-substituted dihydroxy azo disulfonic acid with NH₂ (structure) | pyridine-2-carboxylic acid | grey |
| 46 | " | 8-hydroxyquinoline structure | grey |
| 47 | HO₃S, Cl-substituted dihydroxy azo sulfonic acid with NH₂ (structure) | pyridine-2-carboxylic acid | navy |
| 48 | " | 8-hydroxyquinoline structure | greenish grey |
| 49 | NO₂, Cl-substituted hydroxy azo hydroxynaphthalene sulfonic acid with NH₂ (structure) | pyridine-2-carboxylic acid | grey |
| 50 | " | 8-hydroxyquinoline structure | greenish grey |

TABLE 1-continued

| Example | I | II | III |
|---|---|---|---|
| 51 | [structure: 2-hydroxy-3-sulfo-5-nitrophenyl–N=N–(1-hydroxy-2-sulfo-6-(4-aminophenylamino)naphthalene)] | " | grey |
| 52 | " | pyridine-2-carboxylic acid | grey |
| 53 | " | proline | grey |
| 54 | [structure: 2-hydroxy-3-sulfo-5-nitrophenyl–N=N–(1-hydroxy-2-sulfo-8-amino-naphthalene)] | pyridine-2-carboxylic acid | grey |
| 55 | " | [structure: 8-hydroxyquinoline] | greenish grey |
| 56 | [structure: 3-hydroxy-2-sulfo-6-amino-naphthyl–N=N–(1-hydroxy-8-sulfo-naphthalene)] | " | grey |
| 57 | [structure: 2-hydroxy-4-nitrophenyl–N=N–(1-hydroxy-2-sulfo-6-amino-7-sulfo-naphthalene)] | " | grey |
| 58 | [structure: 2-hydroxy-4-sulfamoylphenyl–N=N–(1-hydroxy-2-sulfo-6-amino-naphthalene)] | " | grey |

TABLE 1-continued

| Example | I | II | III |
|---|---|---|---|
| 59 | (structure: 3,5-dichloro-2-hydroxyphenyl–N=N–1-hydroxy-8-amino-naphthalene-3,6-disulfonic acid) | pyridine-2-carboxylic acid | navy |
| 60 | " | 8-hydroxyquinoline | navy |
| 61 | (structure: 5-chloro-2-hydroxy-3-sulfophenyl–N=N–1-hydroxy-8-amino-naphthalene-3-sulfonic acid) | 8-hydroxyquinoline | navy |
| 62 | " | 5-chloro-8-hydroxyquinoline | greyish blue |
| 63 | (structure: 2-hydroxy-3-sulfo-5-nitrophenyl–N=N–pyrazolone with 4-aminophenyl and CH₃ substituents) | pyridine-2-carboxylic acid | orange |

Further dyes with similar properties are obtained analogously by reacting the 1:1 chromium complexes of the aminoazo compounds which are given in column I of Table 2 below and which have been reacted with the reactive groups indicated in column II, with the colourless compounds listed in column III. The novel dyes produce level dyeings on wool in the shades indicated in column IV.

TABLE 2

| Example | I | II | III | IV |
|---|---|---|---|---|
| 64 | [structure: naphthalene with OH, NH₂, SO₃H groups, N=N azo linkage to phenyl with OH, NO₂, SO₃H] | ClCO—CH(Br)—CH₂—Br | [structure: phenol with SO₃H, OH, and pyridine-fused ring] | reddish grey |
| 65 | [structure: naphthalene with OH, SO₃H, NH₂, N=N azo linkage to phenyl with OH, SO₃H, NO₂] | " | " | greenish grey |
| 66 | [structure: naphthalene with OH, NH₂, SO₃H, N=N azo linkage to phenyl with OH, SO₃H, NO₂] | " | " | reddish grey |
| 67 | [structure: naphthalene with OH, NH₂, N=N azo linkage to naphthalene with OH, SO₃H, SO₃H] | ClCO—CH(Br)—CH₂—Br | [structure: phenol with SO₃H, OH, and pyridine-fused ring] | greyish blue |

TABLE 2-continued

| Example | I | II | III | IV |
|---|---|---|---|---|
| 68 | [structure] | " | " | blue |
| 69 | [structure] | " | " | grey |
| 70 | [structure] | [dichlorotriazine-NH-phenyl-SO₃H structure] | [naphthol-pyridine structure] | grey |
| 71 | " | [dichlorotriazine-NH₂ structure] | " | grey |

TABLE 2-continued
| Example | I | II | III | IV |
|---|---|---|---|---|
| 72 | 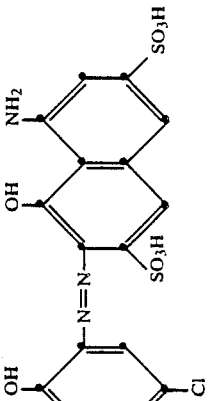 | 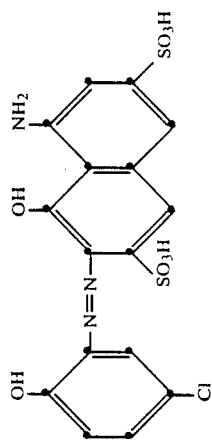 | pyridine-2-carboxylic acid | navy |
| 73 | " | " | 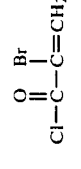 | navy |
| 74 | " | " | glycine | grey |
| 75 | " | " | alanine | grey |
| 76 | " | " | lysine | grey |
| 77 | " | " | aspartic acid | blue |
| 78 | " | " | proline | bluish grey |
| 79 | " | 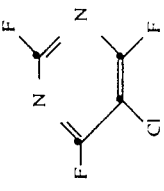 | pyridine-2-carboxylic acid | grey |
| 80 | " | " | pyridine-2-carboxylic acid | grey |

TABLE 2-continued

| Example | I | II | III | IV |
|---|---|---|---|---|
| 81 | ![structure: naphthalene with NH2, OH, SO3H azo-linked to phenyl with OH, NO2, SO3H] | ![triazine with 2 Cl] | pyridine-2-carboxylic acid | grey |
| 82 | " | " | pyridine-2-carboxylic acid | navy |
| 83 | " | $O=C(Br)-CH(Br)-CH_2Br$ | ![8-hydroxyquinoline] | greyish black |
| 84 | ![structure: naphthalene with NH2, OH, SO3H, SO3H azo-linked to phenyl with OH, Cl] | ![triazine with 2 Cl] | ![8-hydroxyquinoline] | grey |
| 85 | " | ![pyrimidine with 2F, vinyl-Cl, F] |  | greenish black |

TABLE 2-continued
| Example | I | II | III | IV |
|---|---|---|---|---|
| 86 |  | O=C(Cl)−CH=CH−Cl | pyridine-2-carboxylic acid | blue |
| 87 | " |  | pyridine-2-carboxylic acid | blue |
| 88 |  | O=C(Cl)−CH=CH−Cl | pyridine-2-carboxylic acid | greenish blue |
| 89 | " |  | pyridine-2-carboxylic acid | grey |
| 90 |  | O=C(Cl)−CH(Br)−CH₂Br | glycine | greyish blue |

TABLE 2-continued

| Example | I | II | III | IV |
|---|---|---|---|---|
| 91 | (structure) | (structure) | (structure) | grey |
| 92 | (structure) | (structure) | (structure) | grey |
| 93 | (structure) | | (structure) | greyish blue |
| 94 | (structure) | | | bluish black |

TABLE 2-continued

| Example | I | II | III | IV |
|---|---|---|---|---|
| 95 | naphthalene with OH, SO₃H, N=N linkage to naphthalene with OH, SO₃H, NH₂ | dichlorotriazine with NH-phenyl-SO₃H | pyridine-2-carboxylic acid | blue |
| 96 | naphthalene with OH, SO₃H, N=N linkage to naphthalene with OH, SO₃H, NH₂ | " | pyridine-2-carboxylic acid | grey |
| 97 | chlorophenol with OH, N=N linkage to naphthalene with OH, SO₃H, SO₃H, NH₂ | " | pyridine-2-carboxylic acid | grey |
| 98 | naphthalene with OH, SO₃H, N=N linkage to naphthalene with OH, SO₃H, NH₂ | dichlorotriazine with OC₂H₅ | pyridine-2-carboxylic acid | blue |

TABLE 2-continued

| Example | I | II | III | IV |
|---|---|---|---|---|
| 99 | [naphthalene with OH, N=N, SO₃H, OH, NH₂, SO₃H] | [triazine with F, F, NH-phenyl-SO₃H] | pyridine-2-carboxylic acid | blue |
| 100 | " | [triazine with F, F, NH-phenyl-CH₃] | pyridine-2-carboxylic acid | blue |
| 101 | " | [triazine with F, F, OC₂H₅] | pyridine-2-carboxylic acid | blue |
| 102 | " | [triazine with Cl, Cl, O-phenyl-H] | pyridine-2-carboxylic acid | blue |
| 103 | [naphthalene with OH, N=N, SO₃H, OH, NH₂, SO₃H] | [triazine with F, F, NH-CH(CH₃)CH₃] | pyridine-2-carboxylic acid | blue |

TABLE 2-continued

| Example | I | II | III | IV |
|---------|---|----|-----|-----|
| 104 | " | difluoro-chloro-chloromethyl pyrimidine (CH₂Cl) | pyridine-2-carboxylic acid | blue |
| 105 | " | difluoro-chloro-methyl pyrimidine (CH₃) | pyridine-2-carboxylic acid | blue |
| 106 | " | fluoro-trichloro pyrimidine | pyridine-2-carboxylic acid | blue |
| 107 | (azo dye: 4-chloro-2-hydroxy-5-sulfophenyl-azo-1-hydroxy-6-amino-3-sulfonaphthalene) | ClCOCHBrCH₂Br | 8-hydroxyquinoline | violet |

TABLE 2-continued

| Example | I | II | III | IV |
|---|---|---|---|---|
| 108 | (naphthalene with OH, NH₂, SO₃H, N=N-phenyl with OH, Cl, SO₃H) | ClCOCHBrCH₂Br | " | navy |
| 109 | (naphthalene with SO₃H, NH₂, OH, N=N-phenyl with OH, NO₂, SO₃H) | ClCOCHBrCH₂Br | " | grey |
| 110 | (naphthalene with NH₂, SO₃H, OH, N=N-phenyl with OH, SO₃H, NO₂) | ClCOCHBrCH₂Br | " | greenish blue |
| 111 | (naphthalene with NH₂, SO₃H, OH, N=N-phenyl with OH, SO₃H, Cl) | ClCOCHBrCH₂Br | (quinoline with OH) | reddish blue |

TABLE 2-continued

| Example | I | II | III | IV |
|---|---|---|---|---|
| 112 | (azo dye structure) | ClCOCHBrCH₂Br | " | grey |
| 113 | (azo dye structure) | ClCOCHBrCH₂Br | " | violet |
| 114 | (azo dye structure) | ClCOCHBrCH₂Br | " | navy |
| 115 | (azo dye structure) | ClCOCHBrCH₂Br | (quinoline-OH structure) | violet |

TABLE 2-continued

| Example | I | II | III | IV |
|---|---|---|---|---|
| 116 | [structure: naphthalene with OH, NH₂, SO₃H substituents, azo-linked to phenyl with OH, Cl, NO₂] | ClCOCHBrCH₂Br | " | greyish blue |
| 117 | [structure: naphthalene with OH, NH₂, SO₃H substituents, azo-linked to naphthalene with OH, SO₃H, SO₃H] | ClCOCHBrCH₂Br | " | blue |
| 118 | [structure: naphthalene with OH, NH₂, SO₃H substituents, azo-linked to phenyl with OH, Cl] | ClCOCHBrCH₂Br | pyridine-2-carboxylic acid | violet |
| 119 | [structure: naphthalene with OH, NH₂, SO₃H, SO₃H substituents, azo-linked to phenyl with OH, Cl, Cl] | ClCOCHBrCH₂Br | pyridine-2-carboxylic acid | greyish blue |

TABLE 2-continued
| Example | I | II | III | IV |
|---|---|---|---|---|
| 120 |  | ClCOCHBrCH$_2$Br | 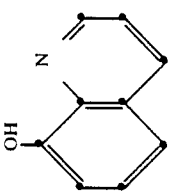 | navy |
| 121 | 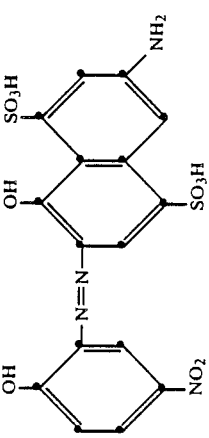 | ClCOCHBrCH$_2$Br | " | violet |
| 122 | 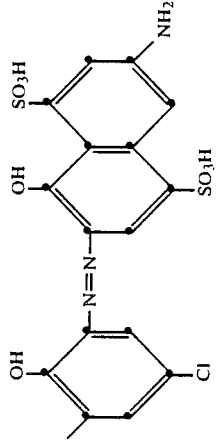 | ClCOCHBrCH$_2$Br | pyridine-2-carboxylic acid | violet |
| 123 | " | ClCOCHBrCH$_2$Br | pyridine-2-carboxylic acid | grey |
| 124 | 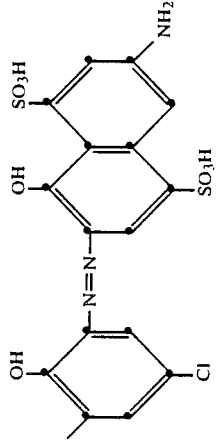 | ClCOCHBrCH$_2$Br | pyridine-2-carboxylic acid | grey |
| 125 | " | ClCOCHBrCH$_2$Br | 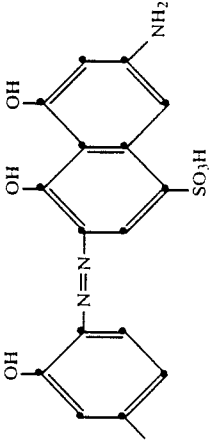 | greenish grey |
| 126 | " | ClCOCHBrCH$_2$Br | pyridine-2-carboxylic acid | greenish grey |

EXAMPLE 127

41.9 parts of the monoazo dye prepared from diazotised 1-hydroxy-2-amino-4-nitrobenzene-6-sulfonic acid and 1-phenyl-3-methyl-5-pyrazolone, in the form of the 1:1 chromium complex which contains 1 atom of chromium per molecule of azo compound, are suspended with stirring in 600 parts of water at 60–70° C. and are brought into solution by adding 5N sodium hydroxide solution to pH 9.0–9.5. A solution of 36.0 parts of crystalline sodium sulfide ($Na_2S \times 9H_2O$) in 100 parts of water is then added dropwise at the same temperature of 60–70° C. in the course of 1 hour. The reduction of the nitro group, accompanied by a change in colour from yellowish orange to orange-tinged red, is complete after 2–3 hours of stirring at the same temperature. The resulting, amino-containing 1:1 chromium complex is precipitated by neutralising the reaction solution and adding sodium chloride, is filtered off and is washed with dilute sodium chloride solution. The resulting filter cake is suspended in 600 parts of water at 60–65° and is dissolved at pH 8.5–9.0 by adding 2N sodium hydroxide solution. After addition of 12.3 parts of pyridine-2-carboxylic acid the reaction mixture is stirred at pH 8.0–9.0 and 60–70° C. until the reaction of the 1:1 chromium complex with the ligand has ended. The resulting orange-tinged red reaction solution is then cooled down to 10–15° C., and a solution of 30 parts of 1,2-dibromopropionyl chloride in 30 parts of acetone is added in the course of 1 hour during which the pH range of 6.0–6.5 is maintained by the dropwise addition of 2N sodium hydroxide solution. After a further 2 hours of stirring at room temperature the metal complex of the following structure

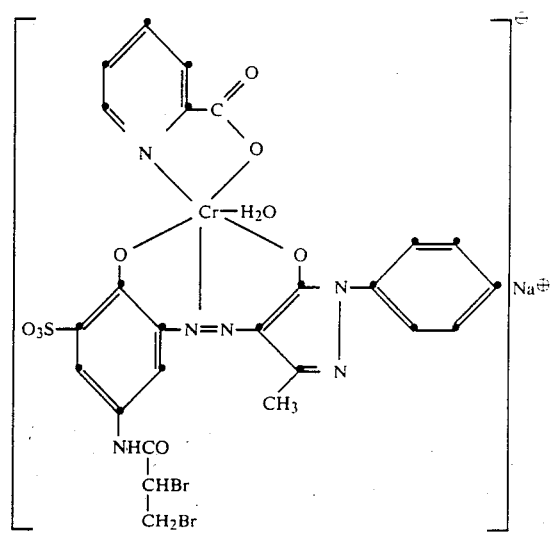

is precipitated out of the reaction solution by adding sodium chloride, is filtered off and is dried at 70° C. in vacuo.

The novel, water-soluble dye produces on wool materials by the indicated dyeing method full and wet- and light-fast orange shades.

If, in the reaction with the amino-containing 1:1 chromium complex, pyridine-2-carboxylic acid is replaced by 14.5 parts of 8-hydroxyquinoline, this produces a somewhat more reddish orange dye having the same colouristic properties.

Further dyes with similar properties are prepared analogously by reacting the amino-containing monoazo compounds indicated in column I of Table 3 below in the form of 1:1 chromium complexes with the colourless compounds listed in column II and then acylating the resulting chromium complex with 1,2-dibromopropionyl chloride. Column III gives the shades which can be obtained with the novel dyes on wool.

TABLE 3

| Example | I | II | III |
|---|---|---|---|
| 128 | [structure: HO3S-phenyl(OH)(NH2)-N=N-C(CH3)=C-pyrazolone-N-phenyl] | [structure: 8-hydroxyquinoline-SO3H] | orange-tinged red |
| 129 | [structure: H2N-phenyl(OH)(SO3H)-N=N-C(CH3)=C-pyrazolone-N-phenyl] | [structure: pyridine-COOH] | yellowish red |

TABLE 3-continued

| Example | I | II | III |
|---|---|---|---|
| 130 | [structure: naphthalene with OH, HO₃S, H₂N substituents, azo-linked to hydrazone with CH₃ and phenyl group] | " | bluish red |
| 131 | | [structure: benzene with HO₃S, OH substituents fused to pyridine ring] | claret |
| 132 | [structure: HO₃S, OH, NH₂-substituted benzene azo-linked to OH, tert-butyl-substituted benzene] | " | reddish brown |
| 133 | [structure: HO₃S, OH, NH₂-substituted benzene azo-linked to hydroxynaphthalene] | [structure: pyridine with COOH] | violet-tinged grey |
| 134 | [structure: HO₃S, OH, H₂N-substituted naphthalene azo-linked to hydroxynaphthalene] | " | bluish grey |
| 135 | | [structure: benzene with HO₃S, OH fused to pyridine] | greenish grey |
| 136 | [structure: OH, NO₂, Cl-substituted benzene azo-linked to OH, NH₂, HO₃S, SO₃H-substituted naphthalene] | [structure: pyridine with COOH] | grey |

TABLE 3-continued

| Example | I | II | III |
|---|---|---|---|
| 137 | [structure: naphthalene-OH-SO3H / HO3S-naphthalene-N=N-naphthol with SO3H] | H2N(CH2)4—CH—C(=O)OH, NH2 | greenish blue |
| 138 | [structure: HO3S-naphthalene-OH / N=N / OH-naphthalene-HO3S-NH2] | HO—CH2—CH(NH2)—C(=O)OH | grey |
| 139 | [structure: NO2-phenyl-OH / N=N / OH-naphthalene-SO3H] | H2N(CH2)4—CH(NH2)—C(=O)OH | blue |

EXAMPLE 140

41.9 parts of the monoazo dye obtained from diazotised 1-hydroxy-2-amino-4-nitrobenzene 6-sulfonic acid and 1-phenyl-3-methyl-5-pyrazolone, in the form of the 1:1 chromium complex which contains 1 atom of chromium per molecule of azo dye, are dissolved with stirring at pH 7 in 500 parts of water.

After addition of 24.0 parts of 7-amino-8-hydroxyquinoline-5-sulfonic acid the reaction mixture is heated to 90–95° C. and is at the same time held at pH 6–7 by the dropwise addition of 2N sodium hydroxide solution, this producing a clear orange-tinged red solution of the only addition product.

After the solution has cooled down to 10–15° C., a solution of 30 parts of 1,2-dibromopropionyl chloride in 30 parts of acetone is added dropwise in the course of 1 hour and pH 6.0–6.5 is maintained by the dropwise additional of 2N of sodium hydroxide solution. AFter a further 3 hours of stirring at room temperature the resulting dye of the following structure

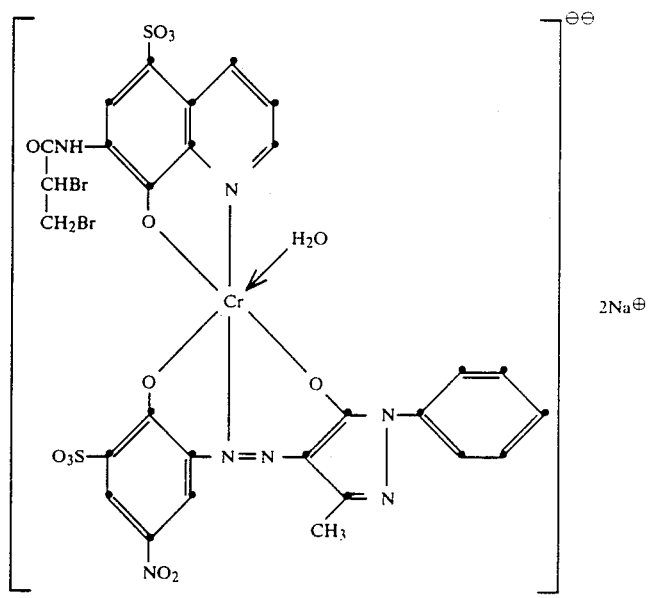

is precipitated from the clear reaction solution obtained, by adding sodium chloride, is filtered off and is dried at 60° C. in vacuo.

The novel, readily water-soluble dye produces on wool materials by the indicated methods full, wet- and light-fast reddish-orange dyeings.

If in place of the abovementioned 1:1 chromium complex the corresponding complexes of monoazo dyes obtained from diazotised 1-amino-2-hydroxynaphthalene-4-sulfonic acid and 1-phenyl-3-methyl-5-pyrazolone or 2-hydroxynaphthalene are reacted with 7-amino-8-hydroxyquinoline-5-sulfonic acid and the product is acylated as described above, this produces structurally similar dyes with which wool can be dyed in full, wet- and light-fast claret and greenish blue shades respectively.

EXAMPLE 141

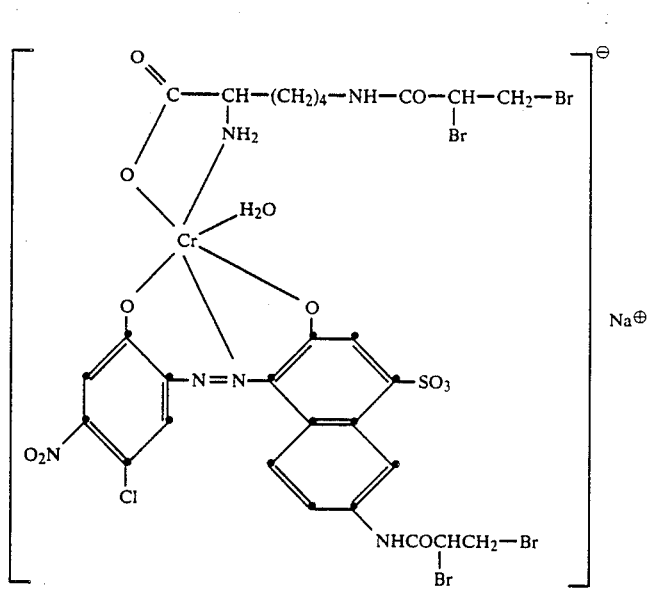

43.9 parts of the 1:1 chromium complex of the monoazo dye obtained by alkaline coupling of 4-chloro-5-nitro-2-aminophenol onto 2-naphthol-6-amino-4-sulfonic acid are suspended in 400 ml of water. 18.3 parts of lysine monohydrochloride are added. The suspension is heated to 75-80° and is held at pH 6.5-6.7 with 2N sodium hydroxide solution, and turns into a solution. The solution is stirred at 75-80° under constant pH control for 1½ hours. After the addition reaction has ended the temperature is allowed to drop to 20-25°, and 68 parts of dibromopropionyl chloride are added dropwise at 20-25° in the course of 20-25 minutes; the pH is maintained at 6.5-6.7 with 20% strength sodium carbonate solution. After the addition is complete the mixture is stirred for 2 hours under constant pH control. The solution of the resulting bisreactive 1:2 chromium complex is clarified and then evaporated to dryness. The product dyes wool in greenish grey shades having good all-round fastness properties.

DYEING EXAMPLE 1

Preparation of the chromium complex of the formula

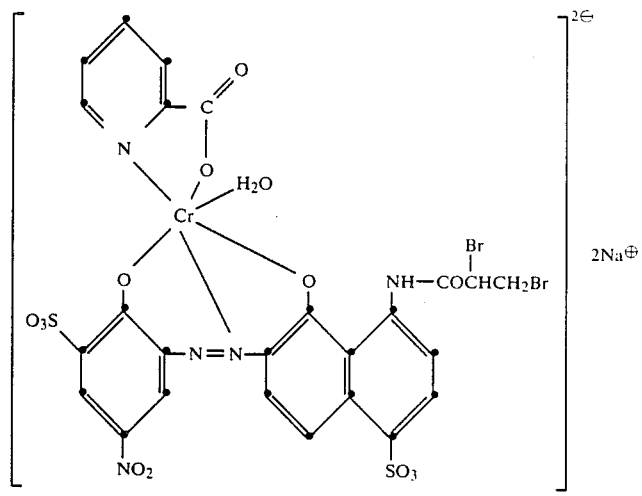

in the dyebath and dyeing at the same time. 10 parts of wool fabric are introduced at 40° into a dyebath which contains, per 340 parts of water, 0.66 part of the 1:1 chromium complex of the formula

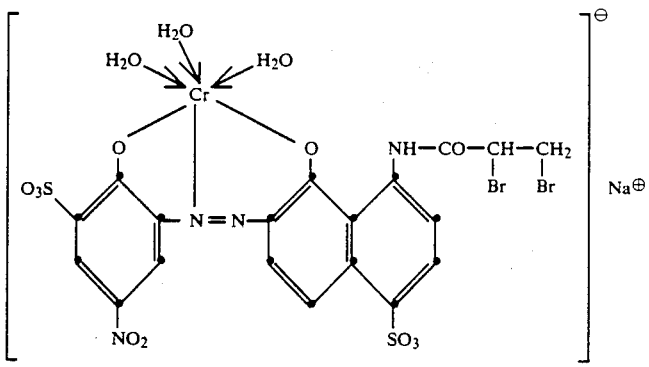

0.66 part of pyridine-2-carboxylic acid, 0.4 part of ammonium sulfate, 0.4 part of 80% acetic acid and 0.2 part of a levelling assistant.

The dyebath is raised to 70-75° in the course of 20 minutes and is then held at that temperature for 30 minutes. It is raised to 100° C. in the course of 15 minutes and is held at that temperature for 90 minutes. The temperature is allowed to fall to 85° in the course of 5 minutes; and the bath is brought to about pH 8.5 with 0.4 part of a 25% ammonia solution. The wool fabric is removed from the liquor after 15 minutes at 85° and is rinsed. It has a level navy colour.

DYEING EXAMPLE 2

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

4 parts of the dye obtained as described in Example 2 are dissolved in 100 parts of hot water, and this solution is added to the above dyebath. 100 parts of prewetted wool knitting yarn are then entered into the dyebath, and the temperature of the bath is raised from 50 to 80° in the course of 30 minutes. After 20 minutes of dyeing at 80° the dyebath is heated to the boil and dyeing continues at the boil for 90 minutes. Almost all the dye exhausts onto the substrate. After the bath has cooled down to 80° the pH is raised from about 4.5 to a constant pH of 8.5 by adding ammonia solution, and the dyed material is after-treated at this temperature for 20 minutes. Thorough rinsing with hot and cold water, acidifying with 1 part of 80% formic acid, centrifuging and drying produces a dark blue wool yarn of very good wet and rub fastness and excellent light fastness.

DYEING EXAMPLE 3

A wool fabric with an antifelting finish is impregnated with the preparation described hereinafter and is squeezed off on a pad-mangle to a moisture pick-up of 250%:

| | | |
|---|---|---|
| 4 parts | of Diaprint REG (acid-resistant thickener) |
| 1 part | of sulfamic acid |
| 0.2 part | of thymene |
| 0.2 part | of emulsifier |
| 94.6 parts | of water |
| 100 parts | |

The impregnated material is then put into a heatable press together with a transfer paper which bears a print design applied with the dye of Example 3 in conventional manner, and at 100 to 105° is put under a pressure of about 0.5 kg/cm² for 3 minutes. The rinsed and dried wool fabric has a corresponding black print design of very good fastness properties.

DYEING EXAMPLE 4

A piece of chlorinated wool flannel is impregnated on a pad-mangle with the preparation of dye described hereinafter and is squeezed off to a liquor pick-up of 100%:

| | |
|---|---|
| 50 parts | of the dye of Example 6 |
| 300 parts | of urea |
| 320 parts | of Solvitose OFA at 4% (thickener) |
| 10 parts | of a mixture of anionic fatty alcohol ether sulfate with nonionic wetting agents |
| 10 parts | of the levelling agent used in Dyeing Example 2 |
| 10 parts | of sodium metabisulfate |
| 10 parts | of 80% acetic acid |
| 290 parts | of water |
| 1000 parts | of padding liquor |

The impregnated fabric is wound into a roll and packed airtight and is stored in this state at room temperature for 48 hours. The material is rinsed with cold water and then treated in a fresh bath with sufficient 24% ammonia to produce pH 8.5 and is held at 80° for 15 minutes. It is rinsed in warm water and finally acidified with 80% acetic acid and dried. The wool fabric has a full black colour of excellent fastness properties.

DYEING EXAMPLE 5

2 parts of the dye obtained in Example 95 are dissolved in 100 parts of water in the presence of 0.5 part of sodium m-nitrobenzenesulfonate. This solution is used to impregnate a cotton fabric in such a way that its weight increases by 75%, and the fabric is then dried.

The fabric is then impregnated with a warm solution at 20° which contains per litre 5 g of sodium hydroxide and 300 g of sodium chloride, the fabric is squeezed off to 75% liquid pick-up and the dyeing is steamed at 100 to 101° for 30 seconds, is rinsed, is soaped in a 0.3% boiling solution of a nonionic detergent for a quarter of an hour, is rinsed and is dried. The cotton fabric has been dyed in a blue shade of excellent fastness properties.

DYEING EXAMPLE 6

2 parts of the dye obtained in Example 96 are dissolved in 100 parts of water. The solution is added to 1900 parts of cold water, 60 parts of sodium chloride are added, and 100 parts of a cotton fabric are introduced into this dyebath. The temperature is raised to 40°, and after 30 minutes 40 parts of calcined sodium carbonate and a further 60 parts of sodium chloride are added. The temperature is maintained at 40° for 30 minutes, and the dyeing is rinsed and then soaped in a 0.3% boiling solution of a nonionic detergent in the course of 15 minutes, is rinsed and is dried.

The result is a cotton fabric in a neutral grey shade having good fastness properties.

DYEING EXAMPLE 7

A piece of chlorinated wool flannel is impregnated on a pad-mangle with the preparation of dye described hereinafter and is squeezed off to a liquor pick-up of 100%:

---
50 parts of the dye of Example 65
300 parts of Solvitose OFA at 40% (thickener)
20 parts of a mixture of anionic fatty alcohol ether sulfate with nonionic wetting agents
10 parts of the levelling agent used in Dyeing Example 2
10 parts of 80% acetic acid
600 parts of water
1000 parts of padding liquor
---

The impregnated fabric is then put into a steamer and is treated with saturated steam for 20 to 40 minutes. The material is rinsed with cold water and is then treated in a fresh bath with sufficient 24% ammonia solution as to produce a pH of 8.5 and is held at 80° for 15 minutes. After rinsing in warm water the fabric is finally acidified with 80% acetic acid and is dried. The wool fabric is in a full black shade of excellent fastness properties.

DYEING EXAMPLE 8

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.

3 parts of the dye obtained in Example 31 are dissolved in 100 parts of hot water, and this solution is added to the above dyebath. A circulation dyeing apparatus is charged with 100 parts of prewetted slubbing on cops, the temperature of the bath is raised from 50 to 97-99° in the course of 30 minutes, and dyeing then proceeds for 90 minutes at the boil. Almost all the dye exhausts onto the substrate. After the bath has cooled down to 80° it is brought from about pH 4.5 to a constant pH of 8.5 by adding ammonia solution, and the dyed material is after-treated at said temperature. Thorough rinsing with hot and cold water, acidifying with 1 part of 80% formic acid, centrifuging and drying produce a dark violet material of very good wet fastness and excellent light fastness.

DYEING EXAMPLE 9

6 parts of 80% acetic acid, 3 parts of the ammonium salt of the acid sulfuric acid ester of the adduct of a fatty amine (comprising 30% hexadecylamine, 25% octadecylamine and 45% octadecenylamine and 7 moles of ethylene oxide) and 6 parts of ammonium sulfate are dissolved in succession in 1000 parts of water at 50°.

3 parts of the dye obtained in Example 2 are dissolved in 100 parts of hot water, and this solution is added to the above dyebath. A circulation dyeing apparatus is charged with 150 parts of prewetted loose wool, the temperature of the liquor is raised from 50° to 97-99° in the course of 30 minutes, and dyeing then proceeds at the boil for 90 minutes. Almost all the dye exhausts onto the substrate. After the liquor has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark blue substrate having good wet and rub fastness and excellent light fastness.

DYEING EXAMPLE 10

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

0.45 part of the dye obtained in Example 2 and 0.30 part of the yellow dye of the formula

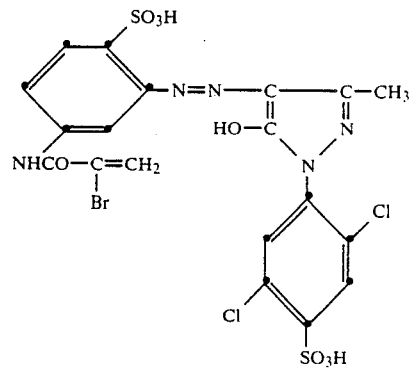

and 0.40 part of the red dye of the formula

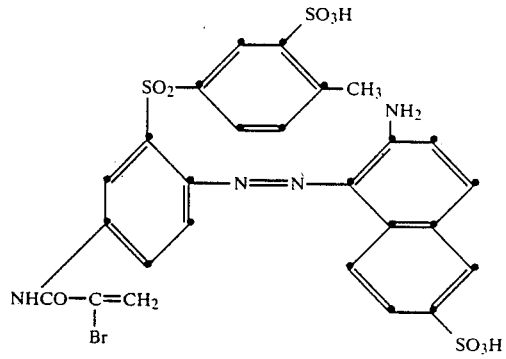

are dissolved in 100 parts of hot water, and this solution is added to the above dyebath. 100 parts of prewetted wool fabric are then introduced into said dyebath, and the temperature of the bath is raised from 50 to 80° in the course of 30 minutes. After 20 minutes of dyeing at 80° the dye-bath is heated to the boil, and dyeing then proceeds at the boil for 90 minutes. Almost all the dye exhausts on to the substrate° After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark brown wool fabric having very good wet and rub fastness and excellent light fastness.

DYEING EXAMPLE 11

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.

0.6 part of the dye obtained in Example 16 and 0.09 part of the yellow dye of the formula

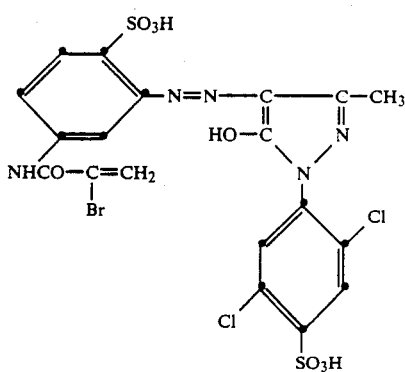

and 0.2 part of the red dye of the formula

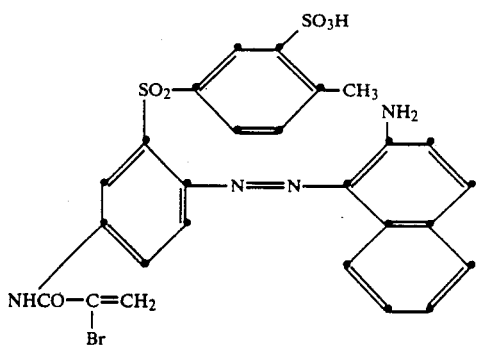

dissolved in 100 parts of hot water, and this solution is added to the above dyebath. A circulation dyeing apparatus is charged with 100 parts of prewetted slubbing on cops, the temperature of the bath is raised from 50 to 97–99° in the course of 30 minutes, and dyeing then proceeds at the boil for 90 minutes. Almost all the dye exhausts onto the substrate. After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produce a grey dyed material having very good wet fastness and excellent light fastness.

We claim:

1. A chromium complex of the formula

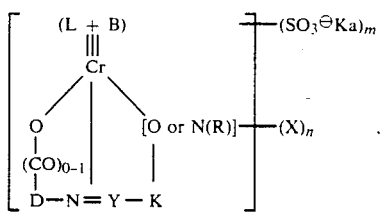

in which L is $H_2O$, $NH_3$, $R_2$—OH, $R_2$—$NH_2$, $(R_2)_2NH$, $(R_2)_3N$ or pyridine, wherein $R_2$ is $C_{1-6}$-alkyl unsubstituted or substituted by halogen, $C_{1-4}$-alkoxy or amino, B is 8-hydroxyquinoline, 5-chloro-8-hydroxyquinoline, 5-hydroxyacridine, 6-hydroxy-4,7-phenanthroline, pyridine-2-carboxylic acid, 8-carboxyquinoline, 5,7-dibromo-8-hydroxyquinoline, o-hydroxyaniline, o-hydroxynaphthylamine, proline, glycine, serine, aspartic acid or $R_1$—$CH(NH_2)$—COOH, wherein $R_1$ is $C_{1-6}$-alkyl unsubstituted or substituted by halogen, $C_{1-4}$-alkoxy or amino, D is benzene or naphthalene, Y is the nitrogen atom or the CH group, K, in the event that Y is the nitrogen atom, is naphthol, naphthylamine, 5-pyrazolone, 5-aminopyrazole, 1-phenyl- or 1-naphthyl-5-aminopyrazole, 1-phenyl- or 1-naphthyl-5-pyrazolone, 2,6-dihydroxy-3-cyano- or -3-carboxamide-4-alkylpyridine, 6-hydroxypyrid-2-one, acetoacetanilide, benzoylacetanilide or phenol, or, in the event that Y is the CH group K is o-hydroxybenzaldehyde or o-hydroxynaphthalehyde, D and K independently of each other are unsubstituted or substituted by $C_{1-4}$-alkyl, $C_{1-4}$-alkoxy, acylamino having 1 to 6 carbon atoms, benzoylamino, amino, monoalkylamino or dialkylamino each having 1 to 4 carbon atoms, phenylamino, alkoxycarbonyl having 1 to 4 carbon atoms in the alkoxy radical, nitro, cyano, trifluoromethyl, halogen, sulfamoyl, carbamoyl, ureido, hydroxyl, $C_{1-4}$-alkylsulfonyl, carboxyl, sulfomethyl, phenylazo or naphthylazo, and D and K contain the —$(CO)_{0-1}$—O—and -[O or N(R)]-adjacent to the —N=Y—and R is hydrogen, $C_{1-4}$-alkyl or phenyl, Ka is a cation, X is α,β-dibromopropionyl, α-bromoacryloyl or 2,4-difluoro-5-chloropyrimidin-6-yl, X is bonded to D, K or B, D and K, D and B or K and B directly or via

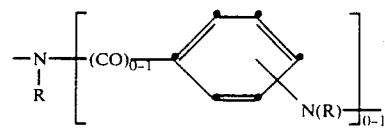

or —$CH_2$—$N(R)$—, m is 1, 2 or 3 and n is 1 or 2.

2. A chromium complex according to claim 1 in which Y is the nitrogen atom.

3. A chromium complex according to claim 1 in which X is bonded to D or K.

4. A chromium complex according to claim 1 in which X is bonded to D or K.

5. A chromium complex according to claim 22 of the formula

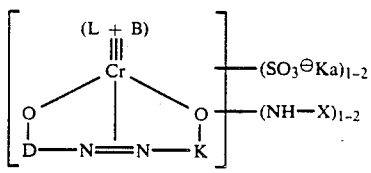

in which B is the radical of 8-hydroxyquinoline, 5-chloro-8-hydroxyquinoline, 8-hydroxyquinoline-7-sulfonic acid, 5,7-dibromo-8-hydroxyquinoline, 8-hydroxyquinoline-5-sulfonic acid which is unsubstituted or substituted by —NH—X, pyridine-2-carboxylic acid, alanine, serine, glycine, lysine, aspartic acid or proline, L is water, D is benzene which contains the oxygen atom in the o-position relative to the azo bridge and is unsubstituted or substituted by sulfo, nitro, chlorine or —NH—X or is naphthalene which contains the oxygen atom in the o-position relative to the azo bridge and is unsubstituted or substituted by sulfo, nitro or —NH—X, K is naphthalene which is unsubstituted or substituted by —NH—X and 1 or 2 sulfonic acid groups, said —NH—X radical being bonded to the naphthalene nucleus either directly or via phenylamino; 1-phenyl-3-methylpyrazol-5-one in which the —NH—X group can be bonded to the phenyl ring, or 1-(2-40,2''-disulfostilbene)-3-methylpyrazol-5-one in which the —NH—X group is bonded in the 4''-position, or is phenyl which is unsubstituted or substituted by $C_{1-4}$-alkyl, X is $\alpha,\beta$-dibromopropionyl or $\alpha$-bromoacryloyl, and Ka is an alkali metal cation.

6. A chromium complex according to claim 5 in which B is 8-hydroxyquinoline or pyridine-2-carboxylic acid.

7. A chromium complex according to claim 5 of the formula

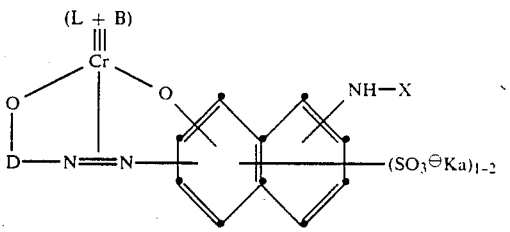

in which B, D, L and Ka are as defined in claim 25, the azo groups is bonded to the naphthalene nucleus in the o-position relative to the —O—radical, X is $\alpha,\beta$-dibromopropionyl or $\alpha$-bromoacryloyl, and the chromium complex contains no more than 1 or 2 sulfo groups.

* * * * *